US012159469B2

(12) United States Patent
Miyazawa et al.

(10) Patent No.: US 12,159,469 B2
(45) Date of Patent: Dec. 3, 2024

(54) VEHICLE RECOGNITION DEVICE, VEHICLE CONTROL SYSTEM, VEHICLE RECOGNITION METHOD, AND STORAGE MEDIUM

(71) Applicant: HONDA MOTOR CO., LTD., Tokyo (JP)

(72) Inventors: Katsunori Miyazawa, Wako (JP); Masahiro Waki, Wako (JP); Shusaku Noda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 369 days.

(21) Appl. No.: 17/557,316

(22) Filed: Dec. 21, 2021

(65) Prior Publication Data

US 2022/0207887 A1    Jun. 30, 2022

(30) Foreign Application Priority Data

Dec. 28, 2020    (JP) .................................. 2020-219643

(51) Int. Cl.
*G06K 9/00* (2022.01)
*B60W 30/10* (2006.01)
*G06V 20/59* (2022.01)

(52) U.S. Cl.
CPC ............. *G06V 20/59* (2022.01); *B60W 30/10* (2013.01); *B60W 2420/403* (2013.01); *B60W 2420/408* (2024.01); *B60W 2510/0638* (2013.01)

(58) Field of Classification Search
CPC .............................................. B60W 2420/408
See application file for complete search history.

(56) References Cited

U.S. PATENT DOCUMENTS

| 2005/0174222 A1 | 8/2005 | Kikuchi |
| 2019/0019042 A1 | 1/2019 | Tanigawa et al. |
| 2019/0156266 A1* | 5/2019 | Hubbard .......... G06Q 10/06398 |
| 2020/0110407 A1 | 4/2020 | Miura et al. |

(Continued)

FOREIGN PATENT DOCUMENTS

| CN | 109241818 | 1/2019 |
| CN | 111158003 | 5/2020 |

(Continued)

OTHER PUBLICATIONS

Japanese Office Action for Japanese Patent Application No. 2020-219643 mailed Jun. 7, 2022.

(Continued)

*Primary Examiner* — Emily C Terrell
*Assistant Examiner* — Aidan Keup
(74) *Attorney, Agent, or Firm* — Amin, Turocy & Watson, LLP

(57) ABSTRACT

A vehicle recognition device includes: an acquisition unit configured to acquire a value of a parameter relating to a degree of dirtiness of an in-vehicle LIDAR device detecting objects using light or a radiowave close to light; and a judgment unit configured to judge a state of the in-vehicle LIDAR device to be an abnormal state in a case in which the value of the parameter continuously exceeds a threshold during a first period, and the amount of change of the value of the parameter in a second period including a part or whole of the first period is within a reference range.

6 Claims, 9 Drawing Sheets

(56) References Cited

U.S. PATENT DOCUMENTS

| | | | |
|---|---|---|---|
| 2020/0142042 A1 | 5/2020 | Hibino et al. | |
| 2020/0254981 A1* | 8/2020 | Takeguchi | B60S 1/481 |
| 2020/0391702 A1* | 12/2020 | Yamauchi | B60Q 9/00 |
| 2022/0126791 A1* | 4/2022 | Shimizu | B08B 3/02 |
| 2022/0153234 A1* | 5/2022 | Shimizu | B60W 30/09 |
| 2022/0206110 A1 | 6/2022 | Goda | |
| 2022/0348168 A1* | 11/2022 | Suzuki | B08B 5/02 |

FOREIGN PATENT DOCUMENTS

| | | |
|---|---|---|
| JP | 2005-140696 | 6/2005 |
| JP | 2010-029917 | 2/2010 |
| JP | 2011-013135 | 1/2011 |
| JP | 2013-134139 | 7/2013 |
| JP | 2017-181105 | 10/2017 |
| JP | 2018-087772 | 6/2018 |
| JP | 2019-015692 | 1/2019 |
| JP | 2019-104364 | 6/2019 |
| JP | 2020-076589 | 5/2020 |
| JP | 2020-184152 | 11/2020 |
| JP | 2020184152 A * | 11/2020 |
| JP | 2020-201216 | 12/2020 |
| WO | 2019/003314 | 1/2019 |
| WO | 2020/230253 | 11/2020 |

OTHER PUBLICATIONS

Japanese Office Action for Japanese Patent Application No. 2022-190066 mailed Oct. 31, 2023.

Chinese Office Action for Chinese Patent Application No. 202111564069.3 mailed Aug. 23, 2024.

\* cited by examiner

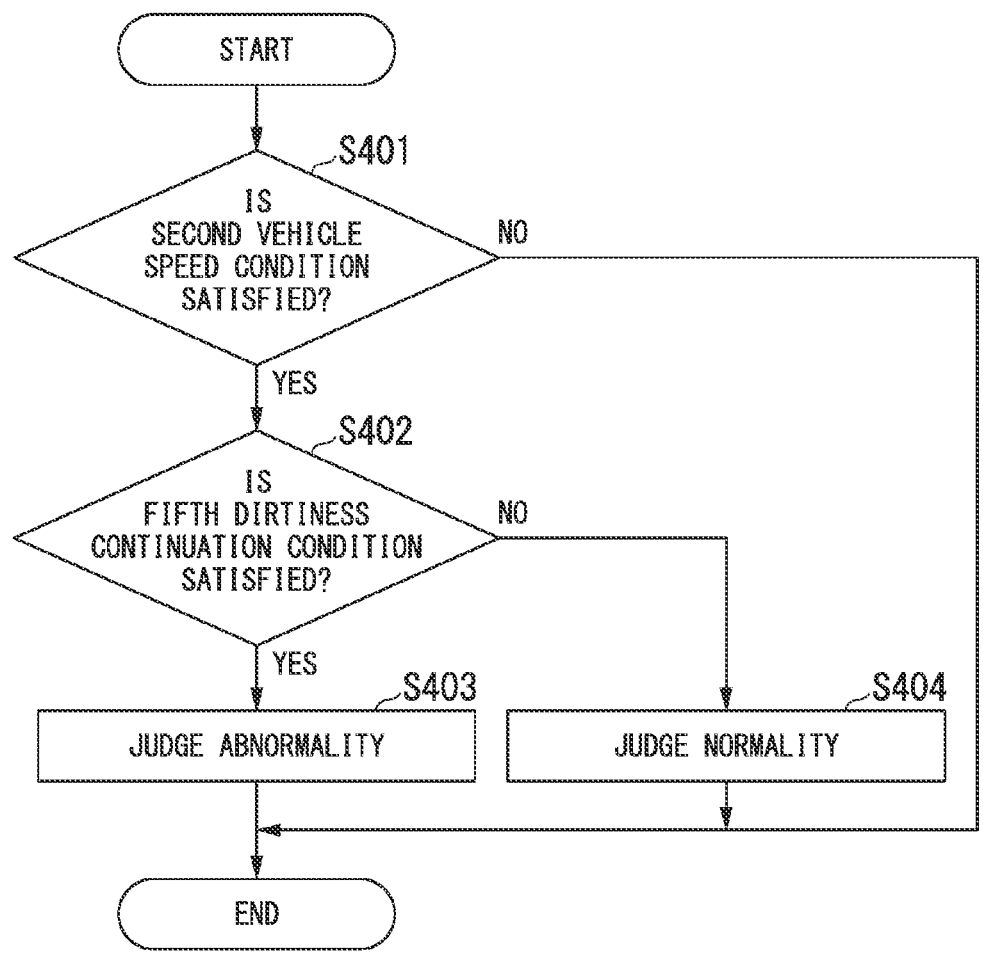

FIG. 10

| LIDAR TYPE | DIRTINESS JUDGING METHOD | DIRTINESS CONTINUATION CONDITION | TARGET SECTION | CORRESPONDENCE EXAMPLE | THRESHOLD CONDITION | NUMBER OF SECTIONS | CONTINUATION TIME |
|---|---|---|---|---|---|---|---|
| FRONT LEFT | THIRD JUDGMENT METHOD | FIRST DIRTINESS CONTINUATION CONDITION | OBLIQUELY LEFT FRONT SECTION AND VEHICLE BODY FRONT-FACE SECTION | A:7-10 | 50% OR MORE | TWO OR MORE | 50 SECONDS |
| | | SECOND DIRTINESS CONTINUATION CONDITION | | A:3-6 | 80% OR MORE | ONE OR MORE | 30 SECONDS |
| FRONT RIGHT | FOURTH JUDGMENT METHOD | FIRST DIRTINESS CONTINUATION CONDITION | OBLIQUELY RIGHT FRONT SECTION AND VEHICLE BODY FRONT-FACE SECTION | B:1-4 | 50% OR MORE | TWO OR MORE | 50 SECONDS |
| | | SECOND DIRTINESS CONTINUATION CONDITION | | B:5-8 | 80% OR MORE | ONE OR MORE | 30 SECONDS |
| REAR LEFT | FIFTH JUDGMENT METHOD | THIRD DIRTINESS CONTINUATION CONDITION | REAR LEFT SIDE-FACE SECTION | D:1-5 | 80% OR MORE | TWO OR MORE | 20 SECONDS |
| | EIGHTH JUDGMENT METHOD | FIFTH DIRTINESS CONTINUATION CONDITION | REAR OBLIQUELY LEFT SECTION | D:6-8 | 80% OR MORE | TWO OR MORE | 20 SECONDS |
| REAR CENTER | SEVENTH JUDGMENT METHOD | FOURTH DIRTINESS CONTINUATION CONDITION | FIRST REAR CENTER SECTION | C:4-7 | 80% OR MORE | ONE OR MORE | 20 SECONDS |
| | TENTH JUDGMENT METHOD | SIXTH DIRTINESS CONTINUATION CONDITION | SECOND REAR CENTER SECTION | C:4-7 | 50% OR MORE | TWO OR MORE | 20 SECONDS |
| REAR RIGHT | SIXTH JUDGMENT METHOD | THIRD DIRTINESS CONTINUATION CONDITION | REAR RIGHT SIDE-FACE SECTION | E:6-10 | 80% OR MORE | TWO OR MORE | 20 SECONDS |
| | NINTH JUDGMENT METHOD | FIFTH DIRTINESS CONTINUATION CONDITION | REAR OBLIQUELY RIGHT SECTION | E:3-5 | 80% OR MORE | TWO OR MORE | 20 SECONDS |

VEHICLE RECOGNITION DEVICE, VEHICLE CONTROL SYSTEM, VEHICLE RECOGNITION METHOD, AND STORAGE MEDIUM

CROSS-REFERENCE TO RELATED APPLICATION

Priority is claimed on Japanese Patent Application No. 2020-219643, filed Dec. 28, 2020, the content of which is incorporated herein by reference.

BACKGROUND OF THE INVENTION

Field of the Invention

The present invention relates to a vehicle recognition device, a vehicle control system, a vehicle recognition method, and a storage medium.

Description of Related Art

In recent years, research on automated control of vehicles has progressed. In automated control of vehicles, detection of a distance from a vehicle to an object disposed in the vicinity of the vehicle is performed using a light detection and ranging (LIDAR) attached to the vehicle. The LIDAR emits light (or electromagnetic waves having a wavelength close to light), measures scattered light thereof, and measures a distance to a target on the basis of a time from light emission to light reception. For this reason, in a case in which dirt is attached to an emission unit of light of a light reception unit of scattered light, there is a likelihood of the measurement performance being degraded. In Japanese Patent Application Publication No. 2019-104364 (hereinafter, referred to as Patent Document 1), automatically controlling a washing unit using a signal detecting attachment of dirt to a camera or a LIDAR is disclosed.

SUMMARY OF THE INVENTION

However, Patent Document 1 does not disclose a specific method for detecting dirt attached to a LIDAR, and thus there are cases in which it is difficult to inhibit degradation of the performance of automated control of a vehicle according to attachment of dirt to the LIDAR in the related art.

An aspect of the present invention is in consideration of such situations, and one object thereof is to provide a vehicle recognition device, a vehicle control system, a vehicle recognition method, and a storage medium capable of inhibiting degradation of the performance of automated control of a vehicle according to attachment of dirt to a LIDAR.

In order to achieve the relating object by solving the problems described above, the present invention employs the following aspects.

(1) According to an aspect of the present invention, there is provided a vehicle recognition device including: an acquisition unit configured to acquire a value of a parameter relating to a degree of dirtiness of an in-vehicle LIDAR device detecting objects using light or an electromagnetic wave close to light; and a judgment unit configured to judge a state of the in-vehicle LIDAR device to be an abnormal state in a case in which the value of the parameter continuously exceeds a threshold during a first period, and the amount of change of the value of the parameter in a second period including a part or whole of the first period is within a reference range.

(2) In the aspect (1) described above, the judgment unit performs the judgment in a case in which a period in which a traveling speed of a vehicle is equal to or higher than a second speed exceeds a third period after the traveling speed of the vehicle in which the in-vehicle LIDAR device is mounted exceeds a first speed, and the second speed may be lower than the first speed.

(3) In the aspect (1) or (2) described above, the acquisition unit acquires the value of the parameter for each of a plurality of sections acquired by dividing a detection range of the in-vehicle LIDAR device, and the judgment unit may perform the judgment for each of the sections on the basis of the threshold set for each of the plurality of sections.

(4) In the aspect (3) described above, the threshold of a section detecting a forward-facing direction of the vehicle in which the in-vehicle LIDAR device is mounted among the plurality of sections may be set to a value smaller than the threshold of any other section.

(5) According to an aspect of the present invention, there is provided a vehicle recognition device including: an acquisition unit configured to acquire a value of a parameter relating to a degree of dirtiness of an in-vehicle LIDAR device detecting objects using light or a electromagnetic wave close to light for each of a plurality of sections acquired by dividing a detection range of the in-vehicle LIDAR device; and a judgment unit configured to judge a state of the in-vehicle LIDAR device to be an abnormal state in a case in which a period in which the value of the parameter is equal to or larger than a threshold exceeds a first period for two or more sections among the plurality of sections.

(6) In the aspect (5) described above, the judgment unit may perform the judgment in a case in which a traveling speed of a vehicle in which the in-vehicle LIDAR device is mounted exceeds a first speed.

(7) According to an aspect of the present invention, there is provided a vehicle control system including: the vehicle recognition device according to any one of aspects (1) to (6) described above; and a vehicle control device configured to control automated driving of a vehicle in which the in-vehicle LIDAR device is mounted, in which the vehicle control device changes a drive mode of the vehicle to a drive mode in which tasks of a high degree are imposed on a driver in a case in which the vehicle recognition device judges the state of the in-vehicle LIDAR device to be the abnormal state.

(8) According to an aspect of the present invention, there is provided a vehicle recognition method using a computer, the vehicle recognition method including: acquiring a value of a parameter relating to a degree of dirtiness of an in-vehicle LIDAR device detecting objects using light or a electromagnetic wave close to light; and judging a state of the in-vehicle LIDAR device to be an abnormal state in a case in which the value of the parameter continuously exceeds a threshold during a first period, and the amount of change of the value of the parameter in a second period including a part or whole of the first period is within a reference range.

(9) According to an aspect of the present invention, there is provided a vehicle recognition method using a computer, the vehicle recognition method including: acquiring a value of a parameter relating to a degree of dirtiness of an in-vehicle LIDAR device detecting objects using light or a electromagnetic wave close to light for each of a plurality of sections acquired by dividing a detection range of the in-vehicle LIDAR device; and judging a state of the in-vehicle LIDAR device to be an abnormal state in a case in which a period in which the value of the parameter is equal to or larger than a threshold exceeds a first period for two or more sections among the plurality of sections.

(10) According to an aspect of the present invention, there is provided a computer-readable non-transitory storage medium storing a program thereon, the program causing a computer to execute: acquiring a value of a parameter relating to a degree of dirtiness of an in-vehicle LIDAR device detecting objects using light or a electromagnetic wave close to light; and judging a state of the in-vehicle LIDAR device to be an abnormal state in a case in which the value of the parameter continuously exceeds a threshold during a first period, and the amount of change of the value of the parameter in a second period including a part or whole of the first period is within a reference range.

(11) According to an aspect of the present invention, there is provided a computer-readable non-transitory storage medium storing a program thereon, the program causing a computer to execute: acquiring a value of a parameter relating to a degree of dirtiness of an in-vehicle LIDAR device detecting objects using light or a electromagnetic wave close to light for each of a plurality of sections acquired by dividing a detection range of the in-vehicle LIDAR device; and judging a state of the in-vehicle LIDAR device to be an abnormal state in a case in which a period in which the value of the parameter is equal to or larger than a threshold exceeds a first period for two or more sections among the plurality of sections.

According to the aspects (1) to (11) described above, a value of a parameter relating to a degree of dirtiness of an in-vehicle LIDAR device detecting objects using light or a electromagnetic wave close to light is acquired, and a state of the in-vehicle LIDAR device is judged to be an abnormal state in a case in which the value of the parameter continuously exceeds a threshold during a first period, and the amount of change of the value of the parameter in a second period including a part or whole of the first period is within a reference range, or the value of the parameter is acquired for each of a plurality of sections acquired by dividing a detection range of the in-vehicle LIDAR device, and a state of the in-vehicle LIDAR device is judged to be an abnormal state in a case in which a period in which the value of the parameter is equal to or larger than a threshold exceeds a first period for two or more sections among the plurality of sections, whereby degradation of performance of automated control of a vehicle due to attachment of dirt to the LIDAR can be inhibited.

BRIEF DESCRIPTION OF THE DRAWINGS

FIG. 9 is a flowchart illustrating an example of the flow of a dirtiness judging process using an eighth judgment method according to an embodiment.

FIG. 10 is a diagram illustrating an overview of third to tenth judgment methods according to an embodiment.

DETAILED DESCRIPTION OF THE INVENTION

Hereinafter, a vehicle recognition device, a vehicle control system, a vehicle recognition method, and a storage medium according to embodiments of the present invention will be described with reference to the drawings.

[Entire Configuration]

Figure 1:
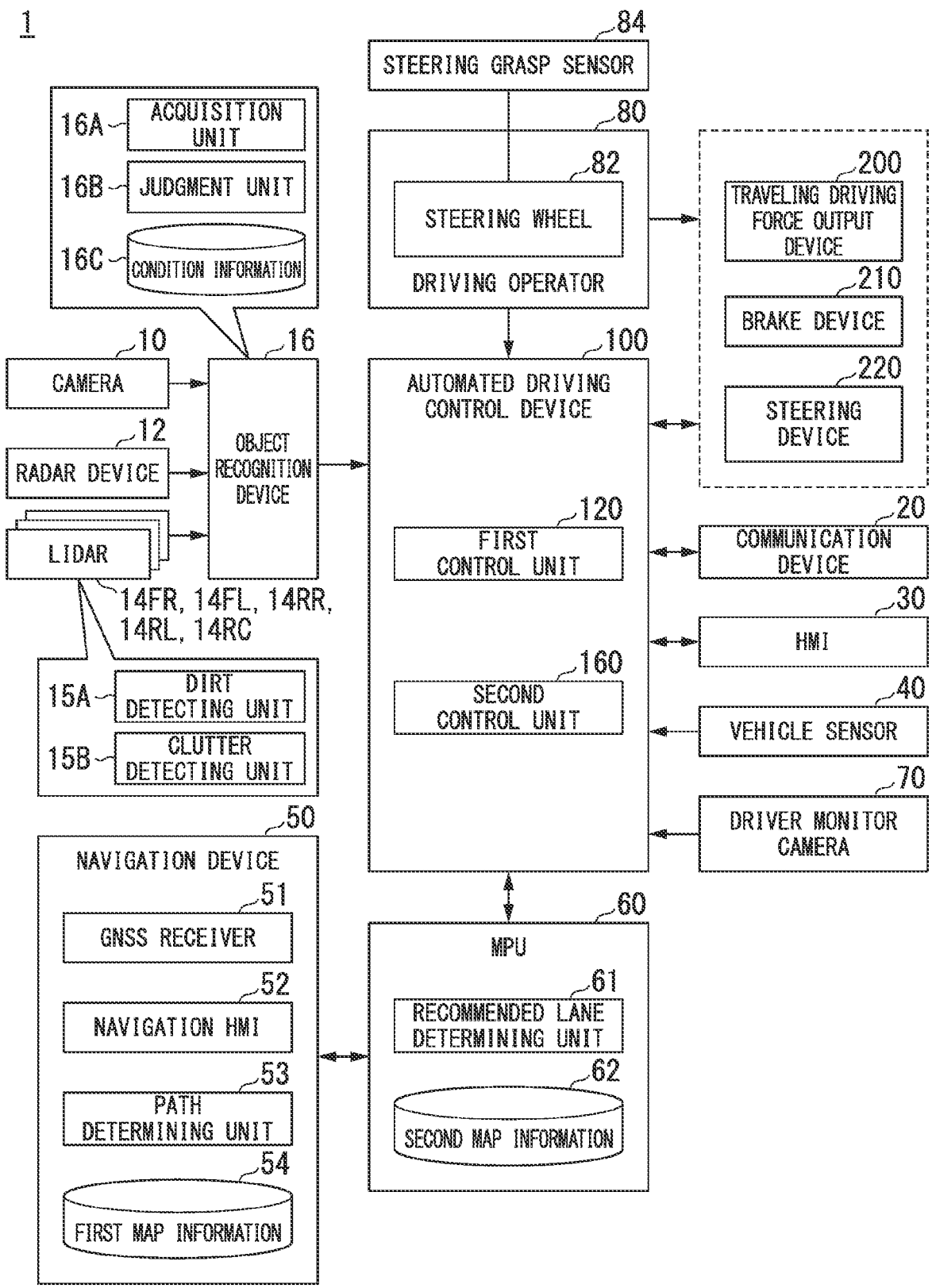
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted, for example, is vehicle such as a two-wheel, three-wheel, or four-wheel vehicle, and a driving source thereof is an internal combustion engine such as a diesel engine or a gasoline engine, an electric motor, or a combination thereof. The electric motor is operated using electric power generated by a power generator connected to an internal combustion engine or discharge electric power of a secondary battery or a fuel cell. The vehicle system 1 is an example of a "vehicle control system".

For example, the vehicle system 1 includes a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving control device 100, a traveling driving force output device 200, a brake device 210, and a steering device 220. Such devices and units are mutually connected using a multiplexing communication line such as a controller area network (CAN) communication line, a serial communication line, a radio communication network, or the like. The configuration illustrated in FIG. 1 is merely an example, and a part of the configuration may be omitted, and an additional configuration may be further added.

The camera 10, for example, is a digital camera using a solid-state imaging device such as a charge coupled device (CCD) or a complementary metal oxide semiconductor (CMOS). The camera 10 is installed at an arbitrary place in a vehicle (hereinafter, a subject vehicle M) in which the vehicle system 1 mounted. In a case in which a side in front is to be imaged, the camera 10 is attached to an upper part of a front windshield, a rear face of a room mirror, or the like. The camera 10, for example, periodically images the vicinity of the subject vehicle M repeatedly. The camera 10 may be a stereo camera.

The radar device 12 emits electromagnetic waves such as millimeter waves to the vicinity of the subject vehicle M and detects at least a position of (a distance and an azimuth) a target object by detecting electromagnetic waves (reflected waves) reflected by the target object. The radar device 12 is installed at an arbitrary place on the subject vehicle M. The radar device 12 may detect a position and a speed of an object using a frequency modulated continuous wave (FM-CW) system.

For example, the LIDAR 14 includes LIDARs 14FL, 14FR, 14RR, 14RL, and 14RC. Hereinafter, in a case in which LIDARs do not need to be particularly distinguished from each other, they will be collectively referred to as a LIDAR 14 in description. The LIDAR 14 emits light (or a electromagnetic wave having a wavelength close to light) to the vicinity of the subject vehicle and measures scattered light. For example, the LIDAR 14 emits infrared light. The LIDAR 14 detects a distance to a target on the basis of a time from light emission to light reception. For example, the emitted light is pulse-shaped laser light. The LIDARs 14 are attached to arbitrary places in the subject vehicle. In this embodiment, the LIDAR 14FL is installed on a left side in a front part of the subject vehicle (for example, on a left side of a front bumper), the LIDAR 14FR is installed on a right side in the front part of the subject vehicle (for example, a right side of the front bumper), the LIDAR 14RC is installed at the center in a rear part of the subject vehicle (for example, at the center of the rear bumper), the LIDAR 14RL is installed on a left side in the rear part of the subject vehicle (for example, a left side of the rear bumper), and the LIDAR 14RR is installed on a right side in the rear part of the subject vehicle (for example, a right side of the rear bumper). The LIDAR 14 is an example of an "in-vehicle LIDAR device".

The LIDAR 14 according to this embodiment may have a function of detecting dirt attached to a light emission part or a light reception part (hereinafter referred to as "LIDAR dirt") and a function of detecting an occurrence factor of a clutter (hereinafter referred to as a "clutter factor") in addition to the basic function described above (hereinafter referred to as a "LIDAR function"). In order to realize such functions, the LIDAR 14 according to this embodiment includes a dirt detecting unit 15A and a clutter detecting unit 15B. Any one of the dirt detecting unit 15A and the clutter detecting unit 15B detects LIDAR dirt and an occurrence of a clutter factor on the basis of a detection result (a reflection point and a reflection intensity of light) according to the LIDAR function.

Here, a clutter is an electromagnetic wave generated in accordance with a electromagnetic wave (including light) emitted from a detection device such as the LIDAR 14 or the radar device 12 being reflected on a spatial scattering object such as snow, rain, fog, or spray. The clutter is a factor generating noise in a detection device such as the LIDAR 14 or the radar device 12. The clutter factor and the LIDAR dirt are the same in that they are detected as reflection points in accordance with the LIDAR function and can be classified from a point that they have different detection distances. The LIDAR dirt is an object attached to the LIDAR 14 and thus, for example, can be classified as a reflection point detected in the range of 0.3 m from the LIDAR 14. On the other hand, the clutter factor depends on the environment of the vicinity of the LIDAR 14 and thus, for example, can be classified as a reflection point detected in the range of 5 m from the LIDAR 14.

The dirt detecting unit 15A and the clutter detecting unit 15B, for example, are realized by a hardware processor such as a central processing unit (CPU) executing a program (software). The dirt detecting unit 15A may be realized by hardware (a circuit unit: includes circuitry) such as a large scale integration (LSI), an application specific integrated circuit (ASIC), a field-programmable gate array (FPGA), a graphics processing unit (GPU), or the like or may be realized by software and hardware in cooperation. The program may be stored in advance in a storage device (a storage device including a non-transitory storage medium) such as an HDD or a flash memory of the LIDAR 14 or may be stored in a storage medium that can be loaded or unloaded such as a DVD or a CD-ROM and be installed in an HDD or a flash memory of the LIDAR 14 by loading the storage medium (a non-transitory storage medium) into a drive device.

More specifically, the dirt detecting unit 15A calculates an index representing a degree of dirtiness of the LIDAR (hereinafter referred to as a "dirtiness value") on the basis of a detection result and a reflection intensity according to the LIDAR function. The dirtiness value may be any value as long as it represents the degree of dirtiness of the LIDAR, and the dirtiness value may be calculated using any method. The dirtiness value is one example of a "parameter". In this embodiment, the dirtiness value is assumed to take a value in the range of 0% to 100%. For example, the dirt detecting unit 15A calculates the dirtiness value on the basis of the number of reflection points in the vicinity of the LIDAR 14FL, a distance to each reflection point, and a reflection intensity. The dirt detecting unit 15A calculates the dirtiness value for each of areas acquired by dividing a horizontal detection range of the LIDAR 14 by a predetermined number. Hereinafter, each of areas acquired by dividing a detection range by a predetermined number will be referred to as a section, and a case in which the detection range of each LIDAR 14 is divided into 10 sections will be described in this embodiment. The dirt detecting unit 15A outputs the calculated dirtiness value to the object recognition device 16.

The clutter detecting unit 15B calculates the amount of a space scattering object such as snow, rain, fog, or stray that becomes a clutter factor on the basis of a detection result and a reflection intensity according to the LIDAR function as an index value representing a degree of a clutter factor (hereinafter referred to as a "clutter value"). The clutter detecting unit 15B calculates a clutter value for each section that is similar to that of the dirt detecting unit 15A. The clutter detecting unit 15B outputs the calculated clutter value to the object recognition device 16. Similar to the dirtiness value, in this embodiment, the clutter value may take a value in the range of 0% to 100%.

The object recognition device 16 performs a sensor fusion process for detection results acquired using some or all of the camera 10, the radar device 12, and the LIDARs 14, thereby recognizing a position, a type, a speed, and the like of an object. The object recognition device 16 outputs results of the recognition to the automated driving control device 100. The object recognition device 16 according to this embodiment has a function of judging the state of dirtiness of each LIDAR 14 in addition to the basic function (hereinafter referred to as an "object recognizing function") described above. In order to realize this function, for example, the object recognition device 16 includes an acquisition unit 16A and a judgment unit 16B and stores condition information 16C. The object recognition device 16 is one example of a "dirtiness judging device".

The acquisition unit 16A acquires a dirtiness value and a clutter value detected for each LIDAR 14 from each LIDAR 14.

The judgment unit 16B, for example, is realized by a hardware processor such as a CPU executing a program (software). The judgment unit 16B may be realized by hardware (a circuit unit; includes circuitry) such as an LSI, an ASIC, a FPGA, a GPU, or the like or may be realized by software and hardware in cooperation. The program may be stored in advance in a storage device (a storage device including a non-transitory storage medium) such as an HDD or a flash memory of the object recognition device 16 or may be stored in a storage medium that can be loaded or unloaded such as a DVD or a CD-ROM and be installed in an HDD or a flash memory of the object recognition device 16 by loading the storage medium (a non-transitory storage medium) into a drive device.

Here, the condition information 16C is information representing a condition for judging the state of dirtiness of each LIDAR 14 (hereinafter referred to as a "dirtiness judgment condition") and is information that includes thresholds for various observed state values of the subject vehicle starting from the dirtiness value. The judgment unit 16B judges the dirtiness judgment condition represented by the condition information 16C on the basis of various state values observed for the subject vehicle, thereby judging the state of dirtiness of the LIDAR 14 to be one of a normal state and an abnormal state. Hereinafter, this judgment will be referred to as "dirtiness judgment". The judgment unit 16B notifies the automated driving control device 100 of a result of the dirtiness judgment.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI includes various display devices, a speaker, a buzzer, a touch panel, switches, keys, and the like. For example, the HMI 30 may perform an operation of notifying that the state of dirtiness of the LIDAR 14 is abnormal (hereinafter, referred to as an "abnormality notification operation") in accordance with an instruction from the automated driving control device 100.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the direction of the subject vehicle M, and the like.

The navigation device 50, for example, includes a global navigation satellite system (GNSS) receiver 51, a navigation HMI 52, and a path determining unit 53. The navigation device 50 stores first map information 54 in a storage device such as an HDD or a flash memory. The GNSS receiver 51 identifies a position of the subject vehicle M on the basis of signals received from GNSS satellites. The position of the subject vehicle M may be identified or complemented using an inertial navigation system (INS) that uses the output of the vehicle sensor 40. The navigation HMI 52 includes a display device, a speaker, a touch panel, a key, and the like. The navigation HMI 52 may be configured to be partially or entirely common as the HMI 30 described above. The path determining unit 53, for example, determines a path from a position of the subject vehicle M identified by the GNSS receiver 51 (or an input arbitrary position) to a destination input by a vehicle occupant using the navigation HMI 52 (hereinafter referred to as a path on a map) by referring to the first map information 54. The first map information 54, for example, is information in which a road form is represented using respective links representing roads and respective nodes connected using the links. The first map information 54 may include a curvature of each road, point of interest (POI) information, and the like. The path on the map is output to the MPU 60. The navigation device 50 may perform path guide using the navigation HMI 52 on the basis of the path on the map. The navigation device 50, for example, may be realized using a function of a terminal device such as a smartphone, a tablet terminal, or the like held by the vehicle occupant. The navigation device 50 may transmit a current position and a destination to a navigation server through the communication device 20 and acquire a path equivalent to the path on the map from the navigation device.

The MPU 60, for example, includes a recommended lane determining unit 61 and stores second map information 62 in a storage device such as an HDD or a flash memory. The recommended lane determining unit 61 divides the path on the map provided from the navigation device 50 into a plurality of blocks (for example, divides the route into blocks of 100 [m] in the traveling direction of the vehicle) and determines a recommended lane for each block by referring to the second map information 62. The recommended lane determining unit 61 determines in which of lanes numbered from the left side to travel. In a case in which there is a branching place in the path on the map, the recommended lane determining unit 61 determines a recommended lane such that the subject vehicle M can travel along a reasonable path for advancement to a branching destination.

The second map information 62 is map information having higher accuracy than the first map information 54. The second map information 62, for example, includes information on the centers of respective lanes or information on boundaries between lanes and the like. In addition, in the second map information 62, road information, traffic regulation information, address information (addresses and postal codes), facility information, telephone number information, and the like may be included. The second map information 62 may be updated as needed by the communication device 20 communicating with another device.

The driver monitor camera 70, for example, is a digital camera using solid-state imaging elements such as a CCD or a CMOS. The driver monitor camera 70 is attached at an arbitrary place in the subject vehicle M in such a position and a direction that a head part of a vehicle occupant sitting on a driver seat of the subject vehicle M (hereinafter referred to as a driver) can be imaged in front (in a direction a face is imaged). For example, the driver monitor camera 70 is attached above a display device disposed at the center of an instrument panel of the subject vehicle M.

The driving operator 80, for example, includes an acceleration pedal, a brake pedal, a shift lever, and other operators in addition to the steering wheel 82. A sensor detecting the amount of an operation or the presence/absence of an operation is installed in the driving operator 80, and a result of detection thereof is output to the automated driving control device 100 or some of all of the traveling driving force output device 200, the brake device 210, and the steering device 220.

The steering wheel 82 is one example of "an operator that accepts a driver's steering operation". The operator does not necessarily need to be in a circular form and may be in the form of a variant steering wheel, a joystick, a button, or the like. A steering grasp sensor 84 is attached to the steering wheel 82. The steering grasp sensor 84 is realized by a capacitive sensor or the like and outputs a signal that can be used for detecting whether or not a driver is grasping the steering wheel 82 (this represents that the driver is contacting the steering wheel in the state of adding a force thereto) to the automated driving control device 100.

The automated driving control device 100, for example, includes a first control unit 120 and a second control unit 160. Each of the first control unit 120 and the second control unit 160, for example, is realized by a hardware processor such as a central processing unit (CPU) executing a program (software). Some or all of such constituent elements may be realized by hardware (a circuit unit; includes circuitry) such as a large scale integration (LSI), an application specific integrated circuit (ASIC), a field-programmable gate array (FPGA), a graphics processing unit (GPU), or the like or may be realized by software and hardware in cooperation. The program may be stored in a storage device (a storage device including a non-transitory storage medium) such as an HDD, a flash memory, or the like of the automated driving control device 100 in advance or may be stored in a storage medium such as a DVD or a CD-ROM that can be loaded or unloaded and installed in the HDD or the flash memory of the automated driving control device 100 by loading the storage medium (a non-transitory storage medium) into a drive device. The automated driving control device 100 is one example of a "vehicle control device", and a combination of an action plan generating unit 140 and the second control unit 160 is one example of a "driving control unit".

Figures 2, 3:
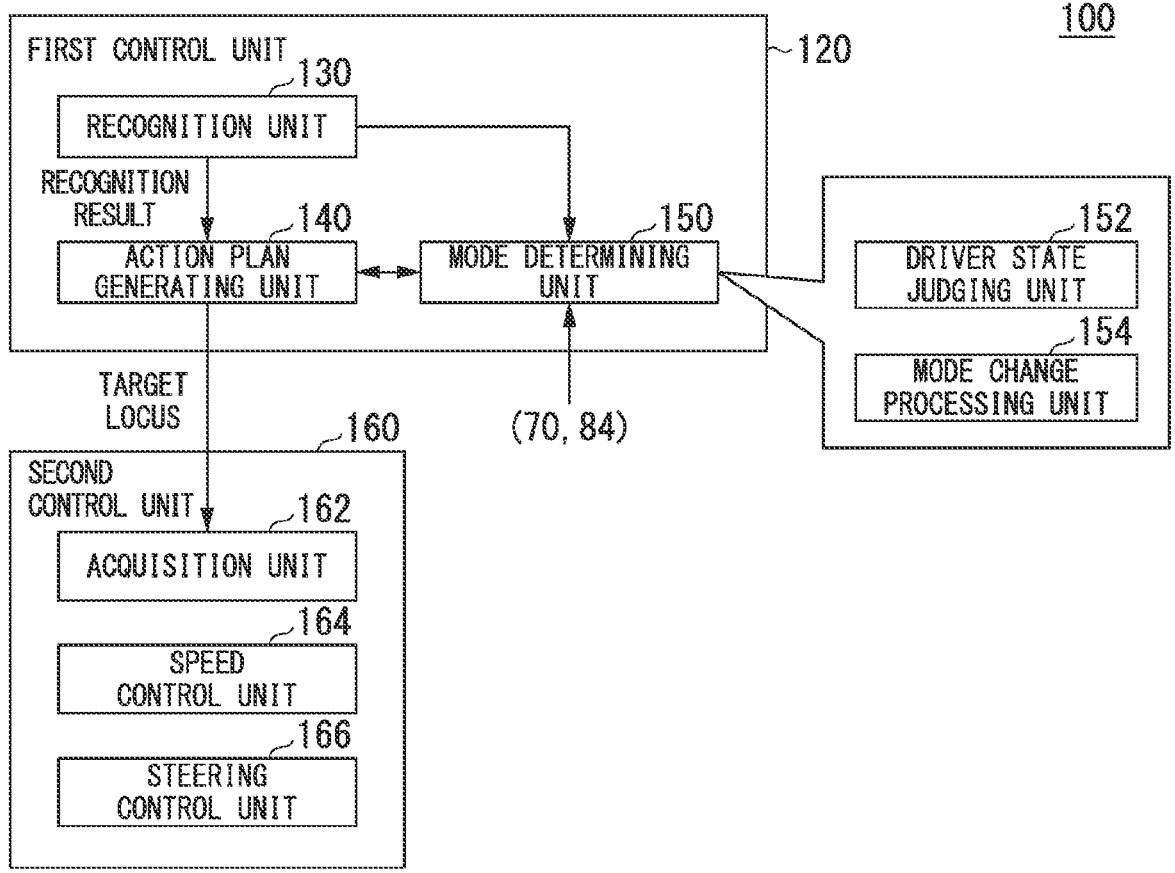
FIG. 2 is a functional configuration diagram of a first control unit and a second control unit.
FIG. 3 is a diagram illustrating an example of correspondence relations between a drive mode, a control state of a subject vehicle, and tasks.

FIG. 2 is a functional configuration diagram of the first control unit 120 and the second control unit 160. The first control unit 120, for example, includes a recognition unit 130, an action plan generating unit 140, and a mode determining unit 150. The first control unit 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a signal, a road marking, and the like that can be used for pattern matching) at the same time and comprehensively evaluating both recognitions by assigning scores to them. Accordingly, the reliability of automated driving is secured.

The recognition unit 130 recognizes states such as positions, speeds, and accelerations of objects present in the vicinity of the subject vehicle M on the basis of information input from the camera 10, the radar device 12, and the LIDAR 14 through the object recognition device 16. A position of an object, for example, is recognized as a position on absolute coordinates using a representative point (a center of gravity, a drive axis center, or the like) of the subject vehicle M as its origin and is used for control. The position of the object may be represented as a representative point such as a center of gravity, a corner, or the like of the object or may be represented in a representative area. A "state" of an object may include an acceleration and a jerk or a "behavior state" of the object (for example, whether or not the object is changing lanes or is about to change lanes).

For example, the recognition unit 130 recognizes a lane in which the subject vehicle M is traveling (traveling lane). For example, the recognition unit 130 recognizes a traveling lane by comparing a pattern of road partition lines (for example, an arrangement of solid lines and broken lines) of road partition lines acquired from the second map information 62 with a pattern of road partition lines in the vicinity of the subject vehicle M recognized in an image captured by the camera 10. The recognition unit 130 may recognize a traveling lane by recognizing traveling road boundaries (road boundaries) including road partition lines, road shoulders, curbstones, a median strip, guard rails, and the like instead of road partition lines. In this recognition, the location of the subject vehicle M acquired from the navigation device 50 or a processing result acquired by the INS may be taken into account as well. The recognition unit 130 recognizes a temporary stop line, an obstacle, a red signal, a toll gate, and other road events.

When recognizing a traveling lane, the recognition unit 130 recognizes a position and a posture of the subject vehicle M with respect to the traveling lane. The recognition unit 130, for example, may recognize a deviation of a reference point of the subject vehicle M from the center of the lane and an angle formed with respect to a line in which the center of the lane in the traveling direction of the subject vehicle M is aligned as a relative position and a posture of the subject vehicle M with respect to the traveling lane. Instead of this, the recognition unit 130 may recognize the position of the reference point of the subject vehicle M with respect to one side end part (a road partition line or a road boundary) of the traveling lane or the like as a relative position of the subject vehicle M with respect to the traveling lane.

The action plan generating unit 140 basically travels in a recommended lane determined by the recommended lane determining unit 61 and generates a target locus along which the subject vehicle M will automatedly travel (travel without being dependent on a driver's operation) in the future such that a surroundings status of the subject vehicle M can be responded to. The target locus, for example, includes a speed element. For example, the target locus is represented as a sequence of places (locus points) at which the subject vehicle M will arrive. A locus point is a place at which the subject vehicle M will arrive at respective predetermined traveling distances (for example, about every several [m]) as distances along the road, and separately from that, a target speed and a target acceleration for each of predetermined sampling times (for example, a fraction of a [sec]) are generated as a part of the target locus.

A locus point may be a position at which the subject vehicle M will arrive at a sampling time for every predetermined sampling time. In such a case, information of a target speed and a target acceleration is represented according to the interval between locus points.

In generating a target locus, the action plan generating unit 140 may set events of automated driving. As events of automated driving, there are a constant-speed traveling event, a low-speed following traveling event, a lane change event, a branching event, a merging event, a take-over event, and the like. The action plan generating unit 140 generates a target locus according to the operating events.

The mode determining unit 150 determines the drive mode of the subject vehicle M to be one of a plurality of drive modes in which tasks imposed on a driver are different. For example, the mode determining unit 150 includes a driver state judging unit 152 and a mode change processing unit 154. These individual functions will be described below.

FIG. 3 is a diagram illustrating an example of correspondence relations between a drive mode, a control state of a subject vehicle M, and tasks. As drive modes of the subject vehicle M, for example, there are five modes including Mode A to Mode E. A control state, that is the degree of automation of driving control of the subject vehicle M is the highest in Mode A and lowers in order of Mode B, Mode C, and Mode D after Mode A, and Mode E has a lowest control state. On the contrary, the degree of tasks imposed on a driver is the lowest in Mode A and becomes higher in order of Mode B, Mode C, and Mode D after Mode A, and the degree of Mode E is the highest. In Modes D and E, the control state is a state other than automated driving, and thus the automated driving control device 100 has a role of ending control relating to automated driving and performing transitioning to driving assistance or manual driving. Hereinafter, details of each drive mode will be described as an example.

In Mode A, an automated driving state is formed, and both front-side monitoring and grasping of the steering wheel 82 (steering wheel grasping in the drawing) are not imposed on a driver. However, even in Mode A, the driver needs to have a posture of the body in which manual driving can be quickly transitioned to in response to a request from a system having the automated driving control device 100 as the center. The automated driving described here means that all the steering and acceleration/deceleration are controlled without being dependent on a driver's operation. Here, a side in front means a space in the traveling direction of the subject vehicle M that is visually recognized through a front windshield. Mode A, for example, is a drive mode that can be executed in a case in which conditions such as the subject vehicle M is traveling at a speed equal to or lower than a predetermined speed (for example, about 50 [km/h]) on a motorway such as an expressway and a preceding vehicle that is a following target is present are satisfied and may be referred to as a traffic jam pilot (TJP). In a case in which such conditions are not satisfied, the mode determining unit 150 changes the drive mode of the subject vehicle M to Mode B.

In Mode B, a driving assisting state is formed, a task of monitoring the side in front of the subject vehicle M (hereinafter referred to as front-side monitoring) is imposed on the driver, and a task of grasping the steering wheel 82 is not imposed. In Mode C, a driving assisting state is formed, and the task of front-side monitoring and the task of grasping the steering wheel 82 are imposed on the driver. Mode D is a drive mode in which a driver's driving operation of a certain degree is necessary for at least one of steering and acceleration/deceleration of the subject vehicle M. For example, in Mode D, driving assistance such as adaptive cruise control (ACC) and a lane keeping assist system (LKAS) is performed. In Mode E, a manual driving state in which driver's driving operations are necessary for both steering and acceleration/deceleration is brought about. In both Mode D and Mode E, naturally, the task of monitoring a side in front of the subject vehicle M is imposed on the driver.

The automated driving control device 100 (and a driving assisting device (not illustrated)) performs an automated lane change according to a drive mode. As automated lane changes, there are an automated lane change (1) according to a system request and an automated lane change (2) according to a driver's request. As the automated lane change (1), there are an automated lane change for overtaking that is performed in a case in which the speed of a preceding vehicle is lower than the speed of the subject vehicle by a reference amount or more and an automated lane change for traveling toward a destination (an automated lane change according to a change of a recommended lane). In the automated lane change (2), in a case in which conditions relating to a speed, a positional relation with surrounding vehicles, and the like are satisfied, when a direction indictor is operated by a driver, the lane of the subject vehicle M is changed in an operation direction thereof.

The automated driving control device 100 performs neither of the automated lane changes (1) and (2) in Mode A. The automated driving control device 100 performs both the automated lane changes (1) and (2) in Modes B and C. The driving assisting device (not illustrated) performs the automated lane change (2) without performing the automated lane change (1) in Mode D. Neither automated lane changes (1) and (2) is performed in Mode E.

In a case in which tasks relating to the determined mode (hereinafter referred to as a current drive mode) are not being performed, the mode determining unit 150 changes the drive mode of the subject vehicle M to a drive mode of which tasks are of a higher degree.

For example, in a case in which a driver has a posture of the body in which a transition to manual driving cannot be performed in accordance with a request from the system (for example, in a case in which the driver continues to look away outside an allowed area or in a case in which a sign making it difficult to perform driving is detected) in Mode A, the mode determining unit 150 performs control of prompting the driver to make a transition to manual driving using the HMI 30 and gradually stopping the subject vehicle M such that it pulls over onto a road shoulder and stopping the automated driving in a case in which the driver does not respond. After the automated driving is stopped, the subject vehicle comes into the state of Mode D or E, and the subject vehicle M can be started by a driver's manual operation. Hereinafter, this similarly applies to "stopping of automated driving". In a case in which a driver is not monitoring a side in front in Mode B, the mode determining unit 150 performs control of urging the driver to monitor a side in front using the HMI 30 and gradually stopping the subject vehicle M to be pulled over and stopping the automated driving in a case in which the driver does not respond. In a case in which the driver is not monitoring the side in front or in a case in which the driver is not grasping the steering wheel 82 in Mode C, the mode determining unit 150 performs control of urging the driver to monitor the side in front using the HMI and/or grasp the steering wheel 82 and gradually stopping the subject vehicle M to be pulled over and stopping the automated driving in a case in which the driver does not respond.

In order to change the mode, the driver state judging unit 152 monitors the state of the driver and judges whether or not the state of the driver is a state according to the task. For example, the driver state judging unit 152 performs a posture estimating process by analyzing an image captured by the driver monitor camera 70 and judges whether or not the driver has a posture of the body in which a transition to manual driving cannot be performed in response to a request from the system. The driver state judging unit 152 performs a visual line estimating process by analyzing the image captured by the driver monitor camera 70 and judges whether or not the driver is monitoring a side in front.

The mode change processing unit 154 performs various processes for changing the mode. For example, the mode change processing unit 154 instructs the action plan generating unit 140 to generate a target locus for stopping on the road shoulder, instructs the driving assisting device (not illustrated) to operate, or controls the HMI 30 for urging the driver to perform an action.

The second control unit 160 performs control of the traveling driving force output device 200, the brake device 210, and the steering device 220 such that the subject vehicle M passes along the target locus generated by the action plan generating unit 140 at scheduled times.

Referring back to FIG. 2, the second control unit 160, for example, includes an acquisition unit 162, a speed control unit 164, and a steering control unit 166. The acquisition unit 162 acquires information of a target locus (locus points) generated by the action plan generating unit 140 and stores the acquired target locus in a memory (not illustrated). The speed control unit 164 controls the traveling driving force output device 200 or the brake device 210 on the basis of speed elements accompanying the target locus stored in the memory. The steering control unit 166 controls the steering device 220 in accordance with a bending state of the target locus stored in the memory. The processes of the speed control unit 164 and the steering control unit 166, for example, are realized by a combination of feed-forward control and feedback control. As one example, the steering control unit 166 executes feed-forward control according to a curvature of a road disposed in front of the subject vehicle M and feedback control based on a deviation from a target locus in combination.

The traveling driving force output device 200 outputs a traveling driving force (torque) for enabling the vehicle to travel to driving wheels. The traveling driving force output device 200, for example, includes a combination of an internal combustion engine, an electric motor, and a transmission, and an electronic control unit (ECU) controlling these. The ECU controls the components described above in accordance with information input from the second control unit 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second control unit 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second control unit 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second control unit 160 or information input from the driving operator 80.

Figure 4:
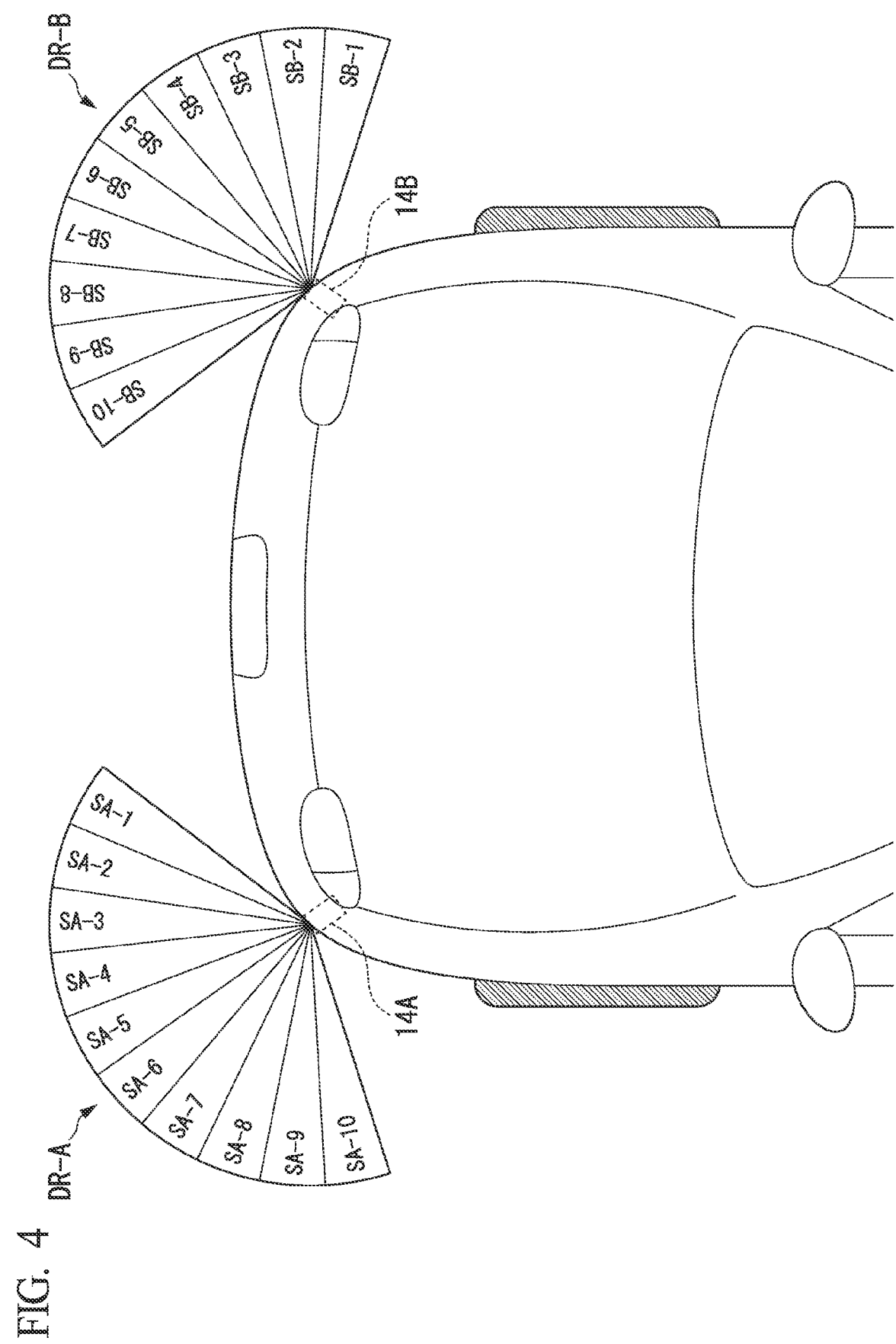
FIG. 4 is a diagram illustrating an example of detection ranges of LIDARs mounted in a subject vehicle in a vehicle system according to an embodiment.
Figure 5:
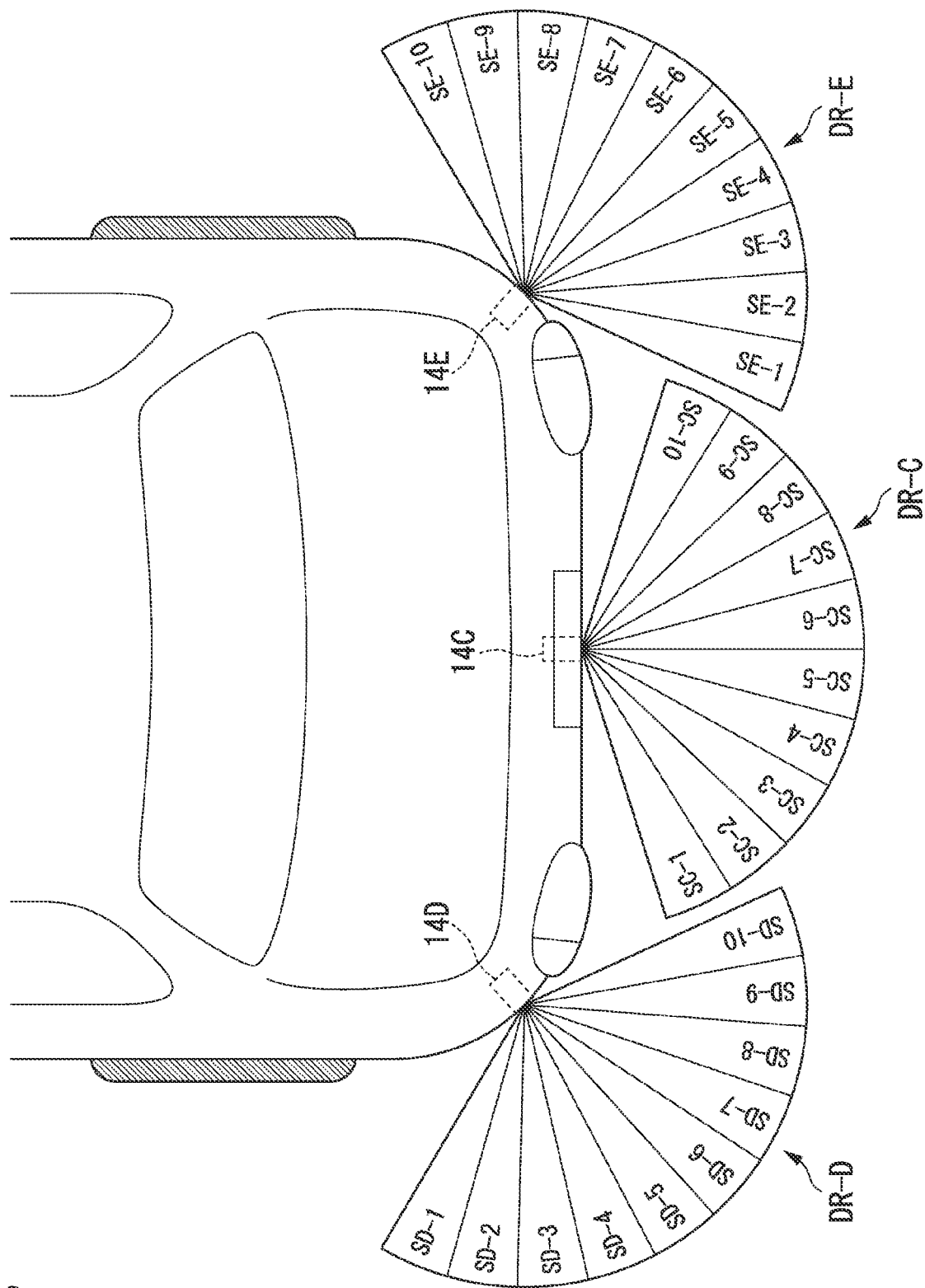
FIG. 5 is a diagram illustrating an example of detection ranges of LIDARs mounted in a subject vehicle in a vehicle system according to an embodiment.

FIGS. 4 and 5 are diagrams illustrating an example of detection ranges of LIDARs 14 mounted in the subject vehicle M in the vehicle system 1 according to this embodiment. FIG. 4 illustrates detection ranges of LIDARs 14FL and 14FR installed in a front part of the subject vehicle M, and FIG. 5 illustrates detection ranges of LIDARs 14RC, 14RL, and 14RR installed in a rear part of the subject vehicle M. In FIG. 4, a detection range DR-A represents a detection range of the LIDAR 14FL, and the detection range DR-A is divided into sections SA-1 to SA-10. A detection range DR-B represents a detection range of the LIDAR 14FR, and the detection range DR-B is divided into sections SB-1 to SB-10. For example, a detection range is a fan-shaped range that covers the range of a center angle of 145 degrees in the horizontal direction, and a section is a fan-shaped range acquired by dividing the detection range for every center angle of 14.5 degrees.

In FIG. 5, a detection range DR-C represents a detection range of the LIDAR 14RC, and the detection range DR-C is divided into sections SC-1 to SC-10. A detection range DR-D represents a detection range of the LIDAR 14RL, and the detection range DR-D is divided into sections SD-1 to SD-10. A detection range DR-E represents a detection range of the LIDAR 14RR, and the detection range DR-E is divided into sections SE-1 to SE-10.

Here, a numerical value [%] written in each section in the drawing represents a threshold of the dirtiness value calculated for each section. Such a threshold is a part of the dirtiness judgment conditions and is stored in the object recognition device 16 in advance as the condition information 16C.

For simplification, in FIGS. 4 and 5, in order to allow the detection range of each LIDAR 14 to be easily understood, each detection range is illustrated in a fan shape (a partial circle), these representing detection ranges in the horizontal direction to allow ease of understanding and do not represent the magnitude relation of detection ranges in a radial direction. The detection ranges of the LIDARs 14 are assumed to have the same size although they have differences in directions. The direction of the detection range of each LIDAR 14 is merely an example and may be appropriately set. As described above, in the vehicle system 1 according to this embodiment, the calculation of a dirtiness value is performed for each section acquired by dividing the detection range of each LIDAR 14 into 10 parts.

Meanwhile, in automated driving control of a vehicle, generally, distance detection on front, rear, and obliquely left/right rear sides with respect to the subject vehicle M is important, and distance detection in such directions needs to have detection accuracy higher than that of other areas. For this reason, for the LIDAR 14 used for detection in such directions, it is preferable that LIDAR dirtiness be resolved while the degree of the dirtiness is relatively low. Thus, in the vehicle system 1 according to this embodiment, a threshold of the dirtiness value is provided for each section of each detection range, and the threshold of a section for detection in a forward-facing direction from the façade of the subject vehicle M is set to be lower than the threshold of the other sections. For example, in the example illustrated in FIG. 4, the threshold of a section near the center is set to a value lower than those of sections near ends.

In accordance with this, local LIDAR dirtiness can be detected, and it can be detected at a relatively early stage that the state of dirtiness of a section having high priority has become abnormal.

Hereinafter, a method of judging the state of dirtiness of each LIDAR 14 on the basis of a dirtiness value calculated for each of such sections will be described. Numerical values illustrated in the following description are merely examples and may be appropriately changed in a range in which this embodiment can be performed.

[1] First Judgment Method (Method for Judging Dirtiness of LIDAR 14 of Front Part)

Figure 6:
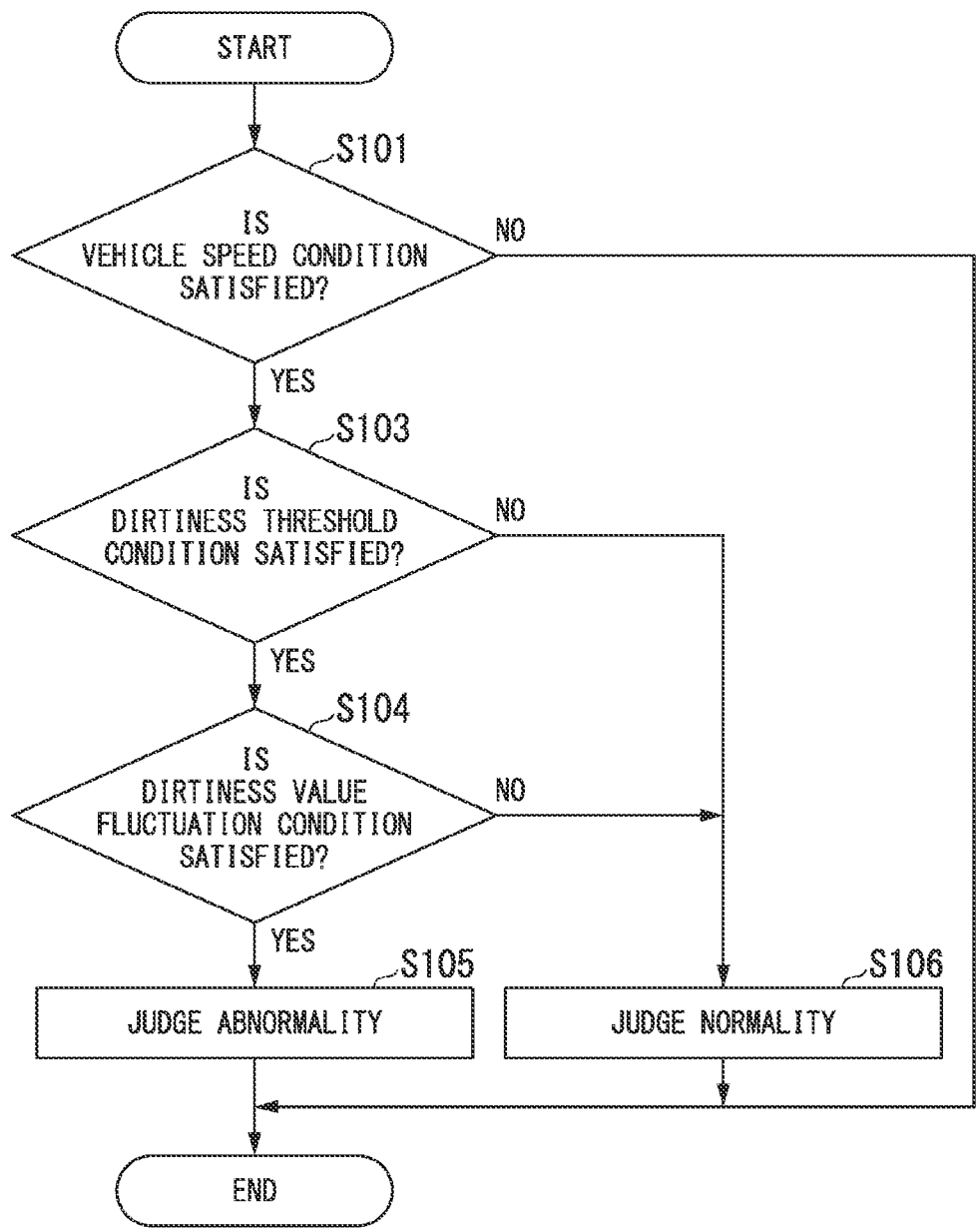
FIG. 6 is a flowchart illustrating an example of the flow of a dirtiness judging process using a first judgment method according to an embodiment.

FIG. 6 is a flowchart illustrating an example of the flow of a dirtiness judging process using the first judgment method. The first judgment method is a method in which, in a case in which each condition of (1) described blow is satisfied for the LIDAR 14 of the front part as one example, judgment of each condition of (2) and (3) is performed, and, in a case in which the conditions (2) and (3) are satisfied, the state of dirtiness of the LIDAR 14 is judged to be abnormal. Although the flowchart illustrated in FIG. 6 represents the flow of one dirtiness judging process, actually, the flow of FIG. 6 is repeatedly performed with a predetermined period, and thus dirtiness judgment is continuously performed. As described above, dirtiness judgment is performed for each LIDAR 14, and thus in description of this flow, the LIDAR 14 that is a target for dirtiness judgment will be referred to as a "target LIDAR".

(1) After the traveling speed of the subject vehicle M exceeds a speed of 40 km per hour, 20 seconds or more have elapsed without the speed being below 20 km per hour (hereinafter this condition will be referred to as a "first vehicle speed condition").

(2) The dirtiness value has constantly exceeded a threshold during the past 300 seconds (hereinafter, this condition will be referred to as a "dirtiness threshold condition").

(3) A difference between a maximum value and a minimum value of the dirtiness value was less than 10% during the past 300 seconds (hereinafter, this condition will be referred to as a "dirtiness value fluctuation condition"). This dirtiness value fluctuation condition being satisfied is one example of the amount of change in the dirtiness value being within a reference range.

The speed 40 km per hour in the first vehicle speed condition is one example of a "first speed", and the speed 20 km per hour in the first vehicle speed condition is one example of a "second speed". 20 seconds in the first vehicle speed condition is one example of a "third period". 300 seconds in the dirtiness threshold condition is one example of a "first period", and 300 seconds in the dirtiness value fluctuation condition is one example of a "second period". The second period may be a period that includes a part or whole of the first period.

In the example of FIG. 6, first, the judgment unit 16B judges whether or not the subject vehicle satisfies the first vehicle speed condition (Step S101). Here, in a case in which it is judged that the subject vehicle satisfies the first vehicle speed condition, the judgment unit 16B judges whether or not there are sections satisfying the dirtiness threshold condition among sections of the target LIDAR (Step S103). Here, in a case in which it is judged that there are sections satisfying the dirtiness threshold condition among the sections of the target LIDAR, the judgment unit 16B judges whether or not there is a section satisfying the dirtiness value fluctuation condition among the sections satisfying the dirtiness threshold condition (Step S104). Here, in a case in which it is judged that there is a section satisfying the dirtiness value fluctuation condition among the sections satisfying the dirtiness threshold condition, the judgment unit 16B judges the state of dirtiness of the target LIDAR to be abnormal and ends the dirtiness judging process (Step S105).

On the other hand, in a case in which it is judged that there are no sections satisfying the dirtiness threshold condition among the sections of the target LIDAR in Step S103 or it is judged that there are no section satisfying the dirtiness value fluctuation condition among sections satisfying the dirtiness threshold condition in Step S104, the judgment unit 16B judges the state of dirtiness of the target LIDAR to be normal and ends the dirtiness judging process (Step S106).

On the other hand, in a case in which it is judged that the subject vehicle does not satisfy the first vehicle speed condition in Step S101, the judgment unit 16B ends the dirtiness judging process without changing the state of dirtiness of the target LIDAR.

[2] Second Judgment Method (Method for Judging Dirtiness of LIDAR 14 of Rear Part)

The second judgment method is basically the same as the first judgment method and is a method for judging the state of dirtiness of the LIDAR 14 of the rear part, and a vehicle body front-face section is not provided in left and right LIDARs 14RL and 14RR of the rear part, which is different from the first judgment method. For example, the vehicle body front-face section is a section that mainly includes a visual field of the forward facing direction of the subject vehicle. In other words, in the second judgment method, for the LIDAR 14RC disposed at the center of the rear part, in a case in which (1) the first vehicle speed condition is satisfied, the judgment unit 16B judges (2) the dirtiness threshold condition and (3) the dirtiness value fluctuation condition and, in a case in which (2) the dirtiness threshold condition and (3) the dirtiness value fluctuation condition are satisfied, judges the state of dirtiness to be abnormal. For the LIDARs 14RL and 14RR disposed on the left and right sides of the rear part, in a case in which (1) the first vehicle speed condition is satisfied, the judgment unit 16B judges (2) the dirtiness threshold condition and (3) the dirtiness value fluctuation condition and, in a case in which (2) the dirtiness threshold condition and (3) the dirtiness value fluctuation condition are satisfied, judges the state of dirtiness to be abnormal.

In the second judgment method, the vehicle body front-face section in the detection range DR-C of the LIDAR 14RC disposed at the center of the rear part is a section that mainly includes a visual field in the rearward-facing direction from the facade of the subject vehicle. For example, in the example of FIG. 5, sections SC-4 and SC-7 among sections SC-1 to SC-10 included in the detection range DR-C of the LIDAR 14RC are vehicle body sections facing from the facade.

[3] Third Judgment Method (Method for Judging Dirtiness of LIDAR 14FL Disposed on the Left Side of the Front Part)

Figure 7:
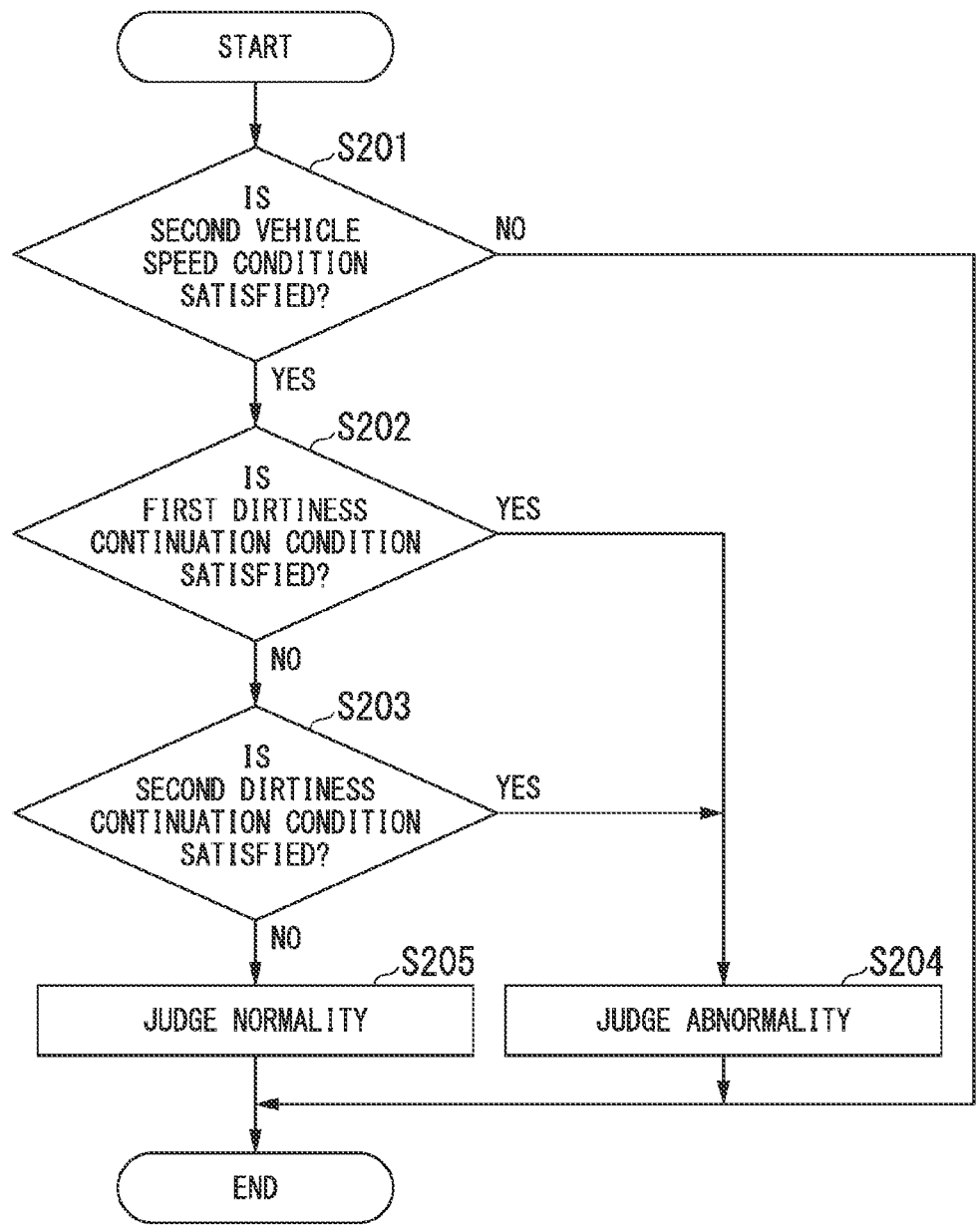
FIG. 7 is a flowchart illustrating an example of the flow of a dirtiness judging process using a third judgment method according to an embodiment.

FIG. 7 is a method of judging the state of dirtiness to be abnormal in a case in which at least one of dirtiness judgment conditions (4) and (6) according to the third judgment method is satisfied. Similar to the flowchart of FIG. 6, although the flowchart illustrated in FIG. 7 represents the flow of one dirtiness judging process, actually, the flow of FIG. 7 is repeatedly performed with a predetermined period, and thus dirtiness judgment is continuously performed.

(4) The traveling speed of the subject vehicle is equal to or higher than 50 km per hour (hereinafter this condition will be referred to as a "second vehicle speed condition").

(5) A state in which there are two or more sections of which dirtiness values are equal to or higher than 50% continues for 50 seconds in an obliquely left front section (hereinafter, this condition will be referred to as a "first dirtiness continuation condition").

(6) A state in which there are one or more sections of which dirtiness values are equal to or higher than 80% continues for 30 seconds in an obliquely left front section and a vehicle body front-face section (hereinafter this condition will be referred to as a "second dirtiness continuation condition").

Here, the obliquely left front section is a section that mainly includes a visual field of the front obliquely left direction of the subject vehicle. For example, in the example of FIG. 4, sections SA-7 to SA-10 among the sections SA-1 to SA-10 included in the detection range DR-A of the LIDAR 14FL are obliquely left front sections. The obliquely left front section may partly overlap with the vehicle body front-face section.

In this case, first, the judgment unit 16B judges whether or not the subject vehicle satisfies the second vehicle speed condition (Step S201). Here, in a case in which it is judged that the subject vehicle satisfies the second vehicle speed condition, the judgment unit 16B judges whether or not there are sections satisfying the first dirtiness continuation condition among sections of the target LIDAR (Step S202). Here, in a case in which it is judged that there is no section satisfying the first dirtiness continuation condition among the sections of the target LIDAR, the judgment unit 16B judges whether or not there are sections satisfying the second dirtiness continuation condition among the sections of the target LIDAR (Step S203). In a case in which it is judged that there are sections satisfying the first dirtiness continuation condition among the sections of the target LIDAR in Step S202 or it is judged that there are sections satisfying the second dirtiness continuation condition among the sections of the target LIDAR in Step S203, the judgment unit 16B judges the state of dirtiness of the target LIDAR to be abnormal and ends the dirtiness judging process (Step S204).

On the other hand, in a case in which it is judged that there is no section satisfying the second dirtiness continuation condition among the sections of the target LIDAR in Step S203, the judgment unit 16B judges the state of dirtiness of the target LIDAR to be normal and ends the dirtiness judging process (Step S205). In a case in which it is judged that the subject vehicle does not satisfy the second vehicle speed condition in Step S201, the judgment unit 16B ends the dirtiness judging process without changing the state of dirtiness of the target LIDAR.

[4] Fourth Judgment Method (a Method for Judging Dirtiness of the LIDAR 14FR Disposed on the Right Side of the Front Part)

The fourth judgment method is basically the same as the third judgment method and is a method of judging the state of dirtiness of the LIDAR 14 disposed on the right side of the front part, and an obliquely right front section is set as a judgment target instead of the obliquely left front section, which is different from the third judgment method. In other words, in the fourth judgment method, in a case in which (4) the second vehicle speed condition is satisfied for an obliquely right front section, (5) the first dirtiness continuation condition and (6) the second dirtiness continuation condition are judged, and, in a case in which at least one of (5) the first dirtiness continuation condition and (6) the second dirtiness continuation condition is satisfied, the state of dirtiness is judged to be abnormal. The second vehicle speed condition in the fourth judgment method is similar to the second vehicle speed condition in the third judgment method.

Here, the obliquely right front section is a section that mainly includes a visual field of the front obliquely right direction of the subject vehicle. For example, in the example of FIG. 4, sections SB-1 to SB-4 among the sections SB-1 to SB-10 included in the detection range DR-B of the LIDAR 14FR are obliquely right front sections. An obliquely right front section may be partly overlap with the vehicle body front-face section.

[5] Fifth Judgment Method (Method for Judging Dirtiness of LIDAR 14RL Disposed on the Left Side of the Rear Part)

Figure 8:
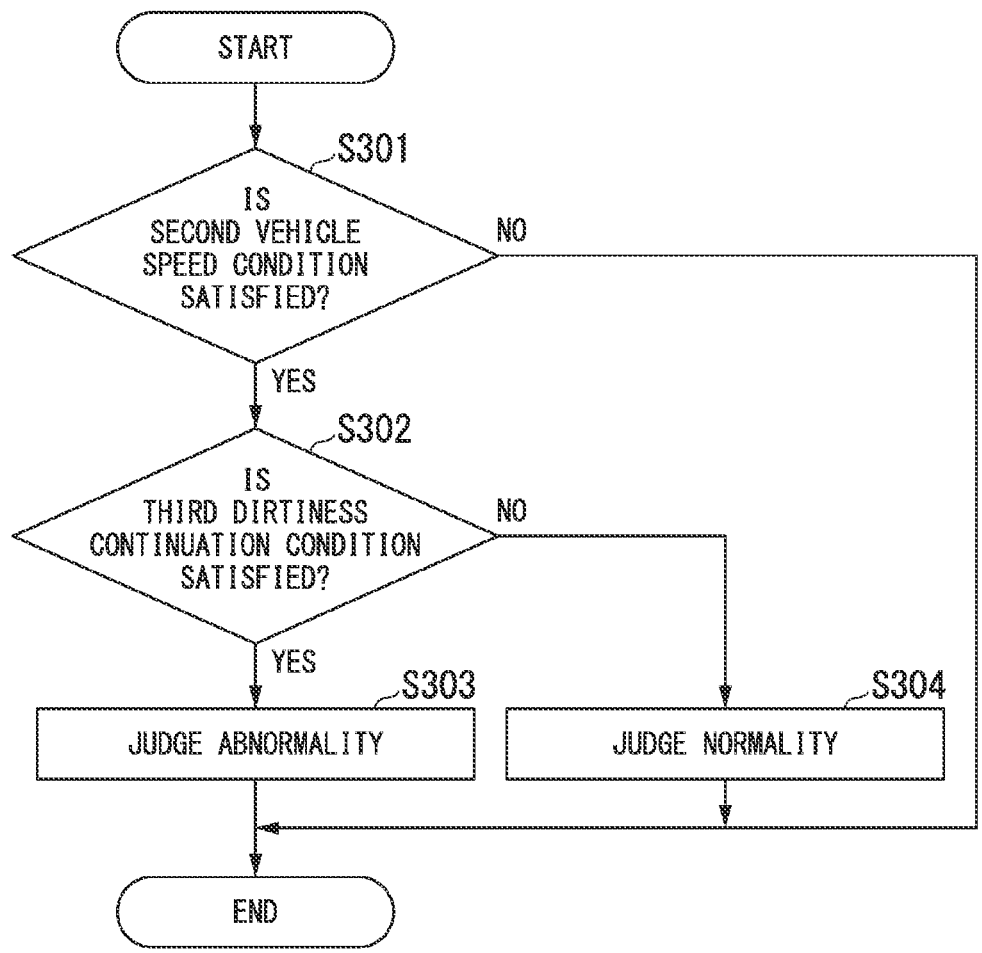
FIG. 8 is a flowchart illustrating an example of the flow of a dirtiness judging process using a fifth judgment method according to an embodiment.

FIG. 8 is a flowchart illustrating an example of the flow of a dirtiness judging process according to the fifth judgment method. The fifth judgment method is a method in which, in a case in which (4) the second vehicle speed condition is satisfied for the LIDAR 14RL disposed on the left side of the rear part, a condition (7) is judged as below, and the state of dirtiness is judged to be abnormal in a case in which the condition (7) is satisfied. Similar to the flowchart of FIG. 7, although the flowchart illustrated in FIG. 8 also represents the flow of one dirtiness judging process, actually, the flow of FIG. 8 is repeatedly performed with a predetermined period, and thus dirtiness judgment is continuously performed. The second vehicle speed condition in the fifth judgment method is similar to the second vehicle speed condition in the fourth judgment method.

(7) A state in which there are two or more sections of which dirtiness values are equal to or higher than 80% continues for 20 seconds for rear left side-face sections (hereinafter this condition will be referred to as a "third dirtiness continuation condition").

Here, a rear left side-face section is a section that mainly includes a visual field viewing from the rear part left side of the subject vehicle in the left side-face direction. For example, in the example of FIG. 5, sections SD-1 to SD-5 among the sections SD-1 to SD-10 included in the detection range DR-D of the LIDAR 14RL are rear left side-face sections. A rear left side-face section may be partly overlap with the vehicle body front-face section.

In this case, first, the judgment unit 16B judges whether or not the subject vehicle satisfies the second vehicle speed condition (Step S301). Here, in a case in which it is judged that the subject vehicle satisfies the second vehicle speed condition, the judgment unit 16B judges whether or not there are sections satisfying the third dirtiness continuation condition among sections of the target LIDAR (Step S302). Here, in a case in which it is judged that there are sections satisfying the third dirtiness continuation condition among the sections of the target LIDAR, the judgment unit 16B judges the state of dirtiness of the target LIDAR to be abnormal and ends the dirtiness judging process (Step S303).

On the other hand, in a case in which it is judged that there is no section satisfying the third dirtiness continuation condition among the sections of the target LIDAR in Step S302, the judgment unit 16B judges the state of dirtiness of the target LIDAR to be normal and ends the dirtiness judging process (Step S304). In a case in which it is judged that the subject vehicle does not satisfy the second vehicle speed condition in Step S301, the judgment unit 16B ends the dirtiness judging process without changing the state of dirtiness of the target LIDAR.

[6] Sixth Judgment Method (Method for Judging Dirtiness of LIDAR 14RR Disposed on the Right Side of the Rear Part)

Although the sixth judgment method is basically the same as the fifth judgment method and is a method of judging the state of dirtiness of the LIDAR 14RR disposed on the right side of the rear part, and a rear right side-face section is set as a judgment target instead of the rear left side-face section, which is different from the fifth judgment method. The sixth judgment method is a method in which, in a case in which (4) the second vehicle speed condition is satisfied for the rear right side-face section, (7) third dirtiness continuation condition is judged, and the state of dirtiness is judged to be abnormal in a case in which (7) the third dirtiness continuation condition is satisfied. The second vehicle speed condition in the sixth judgment method is similar to the second vehicle speed condition in the fifth judgment method.

Here, a rear right side-face section is a section that mainly includes a visual field viewing from the rear part right side of the subject vehicle in the right side-face direction. For example, in the example of FIG. 4, sections SE-6 to SE-10 among the sections SE-1 to SE-10 included in the detection range DR-E of the LIDAR 14RR are rear right side-face sections. A rear right side-face section may be partly overlap with the vehicle body front-face section.

[7] Seventh Judgment Method (Method for Judging Dirtiness of LIDAR 14RC Disposed at the Center of the Rear Part)

Although the seventh judgment method is basically the same as the sixth judgment method and is a method of judging the state of dirtiness of the LIDAR 14RC disposed at the center of the rear part, a center section is set as a judgment target instead of a rear right side-face section, and a fourth dirtiness continuation condition is judged instead of the third dirtiness continuation condition, which is different from the sixth judgment method. More specifically, the fourth dirtiness continuation condition is a condition that a state in which (8) there are one or more sections of which dirtiness values are equal to or higher than 60% continues for 20 seconds for the rear center sections. The second vehicle speed condition in the seventh judgment method is similar to the second vehicle speed condition in the sixth judgment method.

Here, a rear center section is a section that mainly includes a visual field viewing from the center of the rear part of the subject vehicle in the front-face direction. The rear center section includes a vehicle body front-face section of the rear part of the subject vehicle. For example, in the example of FIG. 4, sections SC-4 to SC-7 among the sections SC-1 to SC-10 included in the detection range DR-C of the LIDAR 14RC are rear center sections.

[8] Eighth Judgment Method (Method for Judging Dirtiness of LIDAR 14RL Disposed on the Left Side of the Rear Part)

FIG. 9 is a flowchart illustrating an example of the flow of a dirtiness judging process according to the eighth judgment method. The eighth judgment method is a method in which, in a case in which (4) the second vehicle speed condition is satisfied for the LIDAR 14RL disposed on the left side of the rear part, condition (9) is judged as below, and the state of dirtiness is judged to be abnormal in a case in which the condition (9) is satisfied. Similar to the flowchart of FIG. 8, although the flowchart illustrated in FIG. 9 represents the flow of one dirtiness judging process, actually, the flow of FIG. 9 is repeatedly performed with a predetermined period, and thus dirtiness judgment is continuously performed. The second vehicle speed condition in the eighth judgment method is similar to the second vehicle speed condition in the seventh judgment method.

(10) A state in which there are two or more sections of which dirtiness values are equal to or higher than 80% continues for 20 seconds for rear obliquely left sections (hereinafter this condition will be referred to as a "fifth dirtiness continuation condition").

Here, a rear obliquely left section is a section that mainly includes a visual field viewing from the rear left side-face section to the vehicle center side. For example, in the example of FIG. 5, sections SD-6 to SD-8 among the sections SD-1 to SD-10 included in the detection range DR-D of the LIDAR 14RL are rear obliquely left sections. A rear obliquely left section may be partly overlap with the rear left side-face section.

In this case, first, the judgment unit 16B judges whether or not the subject vehicle satisfies the second vehicle speed condition (Step S401). Here, in a case in which it is judged that the subject vehicle satisfies the second vehicle speed condition, the judgment unit 16B judges whether or not there are sections satisfying the fifth dirtiness continuation condition among sections of the target LIDAR (Step S402). Here, in a case in which it is judged that there are sections satisfying the fifth dirtiness continuation condition among the sections of the target LIDAR, the judgment unit 16B judges the state of dirtiness of the target LIDAR to be abnormal and ends the dirtiness judging process (Step S403).

On the other hand, in a case in which it is judged that there is no section satisfying the fifth dirtiness continuation condition among the sections of the target LIDAR in Step S402, the judgment unit 16B judges the state of dirtiness of the target LIDAR to be normal and ends the dirtiness judging process (Step S404). In a case in which it is judged that the subject vehicle does not satisfy the second vehicle speed condition in Step S401, the judgment unit 16B ends the dirtiness judging process without changing the state of dirtiness of the target LIDAR.

[9] Ninth Judgment Method (Method for Judging Dirtiness of LIDAR 14RR Disposed on the Right Side of the Rear Part)

Although the ninth judgment method is basically the same as the eighth judgment method and is a method for judging the state of dirtiness of the LIDAR 14RR disposed on the right side of the rear part, rear obliquely right sections are set as judgment targets instead of the rear obliquely left sections, which is different from the eighth judgment method. In other words, in the ninth judgment method, in a case in which (4) the second vehicle speed condition is satisfied for a rear obliquely right section, (9) the fifth dirtiness continuation condition is judged, and the state of dirtiness is judged to be abnormal in a case in which (9) the fifth dirtiness continuation condition is satisfied. The second vehicle speed condition in the ninth judgment method is similar to the second vehicle speed condition in the seventh judgment method.

Here, the rear obliquely right section is a section that mainly includes a visual field viewing from the rear right side-face section to the vehicle center side. For example, in the example of FIG. 4, sections SE-3 to SE-5 among the sections SE-1 to SE-10 included in the detection range DR-E of the LIDAR 14RR are rear obliquely right sections. A rear obliquely right section may be partly overlap with the rear right side-face section.

[10] Tenth Judgment Method (Method for Judging Dirtiness of LIDAR 14RC Disposed at the Center of the Rear Part)

Although the tenth judgment method is basically the same as the ninth judgment method and is a method for judging the state of dirtiness of the LIDAR 14RC disposed at the center of the rear part, a second rear center section is set as a judgment target instead of the rear left side-face section, and the sixth dirtiness continuation condition is judged instead of the fifth dirtiness continuation condition, which is different from the ninth judgment method.

More specifically, the sixth dirtiness continuation condition is a condition that (10) a state in which there are two or more sections of which dirtiness values are equal to or higher than 25% continues for 20 seconds for the second rear center section. The second vehicle speed condition in the tenth judgment method is similar to the second vehicle speed condition in the ninth judgment method.

Here, the second rear center section is a section that is included in the rear center sections described in the seventh judgment method (hereinafter referred to as "first rear center sections"). For example, the second rear center section is an area acquired by narrowing the first rear center section to the vehicle body center side. For example, in the example of FIG. 5, sections SC-4 to SC-7 among the sections SC-1 to SC-10 included in the detection range DR-C of the LIDAR 14RC are second rear center sections.

As above, the third to tenth judgment methods including the first to sixth dirtiness continuation conditions have been described. FIG. 10 is a table in which details of the third to tenth judgment methods described above are summarized and represents a LIDAR type, a dirtiness judgment method, a dirtiness continuation condition, target sections, a correspondence example, a threshold condition, the number of sections, and a continuation time in association with each other. Here, the correspondence example represents a section to which the target section corresponds in the example illustrated in FIG. 4. For example, correspondence examples "a:4-6, A:3,4" corresponding to target sections "obliquely left front section and vehicle body front-face sections" illustrate that the obliquely left front sections are the sections SA-4 to SA-6, and vehicle body front-face sections are the sections SA-3 to SA-4. However, these are merely examples and may be appropriately changed.

In the vehicle system 1 according to the embodiment configured in this way, the LIDAR 14 that detects objects using light or a electromagnetic wave close to light calculates a dirtiness value representing a degree of dirtiness of its own device on the basis of results of the detection of the objects described above for each of sections acquired by dividing a detection range of the objects described above into multiple parts, and the object recognition device 16 judges the state of dirtiness of the LIDAR 14 described above to be either normal or abnormal on the basis of the dirtiness value described above calculated for each of a plurality of the sections. By including such a configuration, the vehicle system 1 according to an embodiment can detect an abnormality of the LIDAR 14 at an appropriate timing according to priority levels of the sections. In other words, according to the vehicle system 1 of the embodiment, degradation of the performance of automated control of a vehicle due to attachment of dirt to the LIDAR 14 can be inhibited.

Modified Example

The object recognition device 16 may directly output detection results acquired by the camera 10, the radar device 12, and the LIDARs 14 to the automated driving control device 100. In such a case, the automated driving control device 100 may be configured to include the judgment unit 16B instead of the object recognition device 16 and store the condition information 16C. In such a case, the object recognition device 16 may be omitted from the vehicle system 1.

In the first control unit 120, the mode determining unit 150 may change the drive mode on the basis of a judgment result of dirtiness judgment notified from the object recognition device 16. For example, in a case in which it is notified that the state of dirtiness of the LIDAR 14 is abnormal, the mode determining unit 150 may change the current drive mode to a drive mode in which tasks of a high degree are imposed on a driver. The first control unit 120 or the second control unit 160 may cause the HMI 30 to display the notified the state of dirtiness or may notify other devices such as the navigation device 50 or the MPU 60. The first control unit 120 or the second control unit 160 may be configured to notify a user of the state of dirtiness of the LIDAR 14 by transmitting an electronic mail to the user or performing a push notification to a user terminal.

The embodiment described above can be represented as below.

A vehicle recognition device that includes a storage device storing a program and a hardware processor and, by the hardware processor described above executing the program described above, is configured to acquire a value of a parameter relating to a degree of dirtiness of an in-vehicle LIDAR device detecting objects using light or a electromagnetic wave close to light and judge a state of the in-vehicle LIDAR device described above to be an abnormal state in a case in which the value of the parameter described above continuously exceeds a threshold during a first period, and the amount of change in the value of the parameter described above in a second period including a part or whole of the first period is within a reference range.

The embodiment described above can be represented as below.

A vehicle recognition device that includes a storage device storing a program and a hardware processor and, by the hardware processor described above executing the program described above, is configured to acquire a value of a parameter relating to a degree of dirtiness of an in-vehicle LIDAR device detecting objects using light or an electromagnetic wave close to light for each of a plurality of sections acquired by dividing a detection range of the in-vehicle LIDAR device described above and judge a state of the in-vehicle LIDAR device described above to be an abnormal state in a case in which a period in which the value of the parameter described above is equal to or larger than a threshold for two or more sections among the plurality of sections described above exceeds a first period.

As above, while a form used for performing the present invention has been described using the embodiment, the present invention is not limited to such an embodiment at all, and various modifications and substitutions can be made within a range not departing from the concept of the present invention.

What is claimed is:

1. A vehicle recognition device comprising:
a processor configured to execute a program to:
acquire a value of a parameter relating to a degree of dirtiness of an in-vehicle LIDAR device detecting objects using infrared and visible light waves; and
judge a state of the in-vehicle LIDAR device to be an abnormal state in a case in which the value of the parameter continuously exceeds a threshold during a first period, and the amount of change of the value of the parameter in a second period including a part or whole of the first period is within a reference range,
wherein the processor executes the program to perform the judgment in a case in which a period in which a traveling speed of a vehicle is equal to or higher than a second speed exceeds a third period after the traveling speed of the vehicle in which the in-vehicle LIDAR device is mounted exceeds a first speed, and
wherein the second speed is lower than the first speed.

2. The vehicle recognition device according to claim 1, wherein the processor executes the program to acquire the value of the parameter for each of a plurality of sections acquired by dividing a detection range of the in-vehicle LIDAR device, and
wherein the processor executes the program to perform the judgment for each of the sections on the basis of the threshold set for each of the plurality of sections.

3. The vehicle recognition device according to claim 2, wherein the threshold of a section detecting a forward-facing direction of the vehicle in which the in-vehicle LIDAR device is mounted among the plurality of sections is set to a value smaller than the threshold of any other section.

4. A vehicle control system comprising:
the vehicle recognition device according to claim 1; and
a wherein the processor is configured to execute the program to control automated driving of a vehicle in which the in-vehicle LIDAR device is mounted,
wherein the processor is further configured to execute the program to change a drive mode of the vehicle to a drive mode in which tasks of a high degree are imposed on a driver in a case in which the vehicle recognition device judges the state of the in-vehicle LIDAR device to be the abnormal state.

5. A vehicle recognition method using a computer, the vehicle recognition method comprising:
acquiring a value of a parameter relating to a degree of dirtiness of an in-vehicle LIDAR device detecting objects using infrared and visible light waves; and
judging a state of the in-vehicle LIDAR device to be an abnormal state in a case in which the value of the parameter continuously exceeds a threshold during a first period, and the amount of change of the value of the parameter in a second period including a part or whole of the first period is within a reference range,
wherein the judging comprises performing the judgment in a case in which a period in which a traveling speed of a vehicle is equal to or higher than a second speed exceeds a third period after the traveling speed of the vehicle in which the in-vehicle LIDAR device is mounted exceeds a first speed, and
wherein the second speed is lower than the first speed.

6. A computer-readable non-transitory storage medium storing a program thereon, the program causing a computer to execute:
acquiring a value of a parameter relating to a degree of dirtiness of an in-vehicle LIDAR device detecting objects using infrared and visible light waves; and
judging a state of the in-vehicle LIDAR device to be an abnormal state in a case in which the value of the parameter continuously exceeds a threshold during a first period, and the amount of change of the value of the parameter in a second period including a part or whole of the first period is within a reference range,
wherein the judging comprises performing the judgment in a case in which a period in which a traveling speed of a vehicle is equal to or higher than a second speed exceeds a third period after the traveling speed of the vehicle in which the in-vehicle LIDAR device is mounted exceeds a first speed, and
wherein the second speed is lower than the first speed.

* * * * *